(12) United States Patent
Denman et al.

(10) Patent No.: US 11,403,808 B2
(45) Date of Patent: Aug. 2, 2022

(54) METHODS AND APPARATUS TO TRANSITION BETWEEN 2D AND 3D RENDERINGS OF AUGMENTED REALITY CONTENT

(71) Applicant: Intel Corporation, Santa Clara, CA (US)

(72) Inventors: Pete Denman, Portland, OR (US); John Sherry, Portland, OR (US); Glen J. Anderson, Beaverton, OR (US); Benjamin Bair, Hillsboro, OR (US); Rebecca Chierichetti, Brookings, OR (US); Ankur Agrawal, Portland, OR (US); Meng Shi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/162,762

(22) Filed: Jan. 29, 2021

(65) Prior Publication Data

US 2021/0150803 A1    May 20, 2021

Related U.S. Application Data

(63) Continuation of application No. 16/263,530, filed on Jan. 31, 2019, now Pat. No. 10,909,751.

(51) Int. Cl.
*G06T 15/20* (2011.01)
*G06T 19/00* (2011.01)
(Continued)

(52) U.S. Cl.
CPC ........ *G06T 15/205* (2013.01); *G06F 3/04815* (2013.01); *G06T 15/40* (2013.01); *G06T 19/006* (2013.01); *G06T 19/20* (2013.01)

(58) Field of Classification Search
CPC ..... G06T 15/205; G06T 15/40; G06T 19/006; G06T 19/20; G06F 3/04815; G06F 3/0481
See application file for complete search history.

(56) References Cited

U.S. PATENT DOCUMENTS 9,761,045 B1 *   9/2017   Cote ..................... G06T 15/30
9,846,970 B2    12/2017   Anderson et al.
(Continued)

OTHER PUBLICATIONS

United States Patent and Trademark Office, "Advisory Action Before Filing of an Appeal Brief," issued in connection with U.S. Appl. No. 16/263,530, dated Jul. 27, 2020, 7 pages.
(Continued)

*Primary Examiner* — Jennifer Mehmood
*Assistant Examiner* — Andrew Shin
(74) *Attorney, Agent, or Firm* — Hanley, Flight & Zimmerman, LLC

(57) ABSTRACT

Methods and apparatus to transition between 2D and 3D renderings of augmented reality content are disclosed. An example apparatus includes at least one processor to execute instructions to: determine a first intended movement of an augmented reality (AR) object projected onto a first surface in a real world environment; cause the AR object to be rendered to appear to move along the first surface at a fixed depth defined by the first surface; determine a second intended movement of the AR object projected onto a second surface in the real world environment; and cause the AR object to be rendered to appear to move with variable depth within a 3D virtual space, the 3D virtual space defined by the second surface and a virtual rear boundary, the virtual rear boundary to virtually extend behind the second surface from a perspective of a user.

31 Claims, 8 Drawing Sheets

(51) Int. Cl.
*G06T 19/20* (2011.01)
*G06F 3/04815* (2022.01)
*G06T 15/40* (2011.01)

(56) References Cited

U.S. PATENT DOCUMENTS

| | | |
|---|---|---|
| 9,952,820 B2 | 4/2018 | Anderson et al. |
| 2012/0309477 A1* | 12/2012 | Mayles ................. A63F 13/213 463/3 |
| 2018/0246562 A1* | 8/2018 | Peterson ............... G06F 3/0304 |
| 2018/0322687 A1* | 11/2018 | Kim ....................... G06T 19/003 |
| 2019/0041651 A1 | 2/2019 | Kiemele et al. |
| 2019/0065027 A1* | 2/2019 | Hauenstein ............. G06F 3/014 |
| 2019/0134498 A1 | 5/2019 | Lee |
| 2019/0164334 A1 | 5/2019 | Denman et al. |
| 2019/0228589 A1 | 7/2019 | Dascola et al. |
| 2019/0259205 A1 | 8/2019 | Nissinen et al. |

OTHER PUBLICATIONS

United States Patent and Trademark Office, "Final Office Action," issued in connection with U.S. Appl. No. 16/263,530, dated Apr. 30, 2020, 22 pages.

United States Patent and Trademark Office, "Notice Of Allowance and Fee(s) Due," issued in connection with U.S. Appl. No. 16/263,530, dated Sep. 21, 2020, 9 pages.

United States Patent and Trademark Office, "Non-Final Office Action," issued in connection with U.S. Appl. No. 16/263,530, dated Oct. 3, 2019, 17 pages.

\* cited by examiner

METHODS AND APPARATUS TO TRANSITION BETWEEN 2D AND 3D RENDERINGS OF AUGMENTED REALITY CONTENT

RELATED APPLICATIONS

This patent arises from a continuation of U.S. patent application Ser. No. 16/263,530 (now U.S. Pat. No. 10,909, 751), which was filed on Jan. 31, 2019, and which is incorporated herein by reference in its entirety. Priority to U.S. patent application Ser. No. 16/263,530 is claimed.

FIELD OF THE DISCLOSURE

This disclosure relates generally to augmented reality, and, more particularly, to methods and apparatus to transition between 2D and 3D renderings of augmented reality content.

BACKGROUND

Augmented reality (AR) is a developing technological field that has many different applications from military training to consumer entertainment. AR involves providing a user with an enhanced sensory experience by combining computer generated AR content with the user's perception of the real world. Often, the AR content is rendered to overlay and/or interact with the user and/or other objects in the real world from the perspective of the user.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
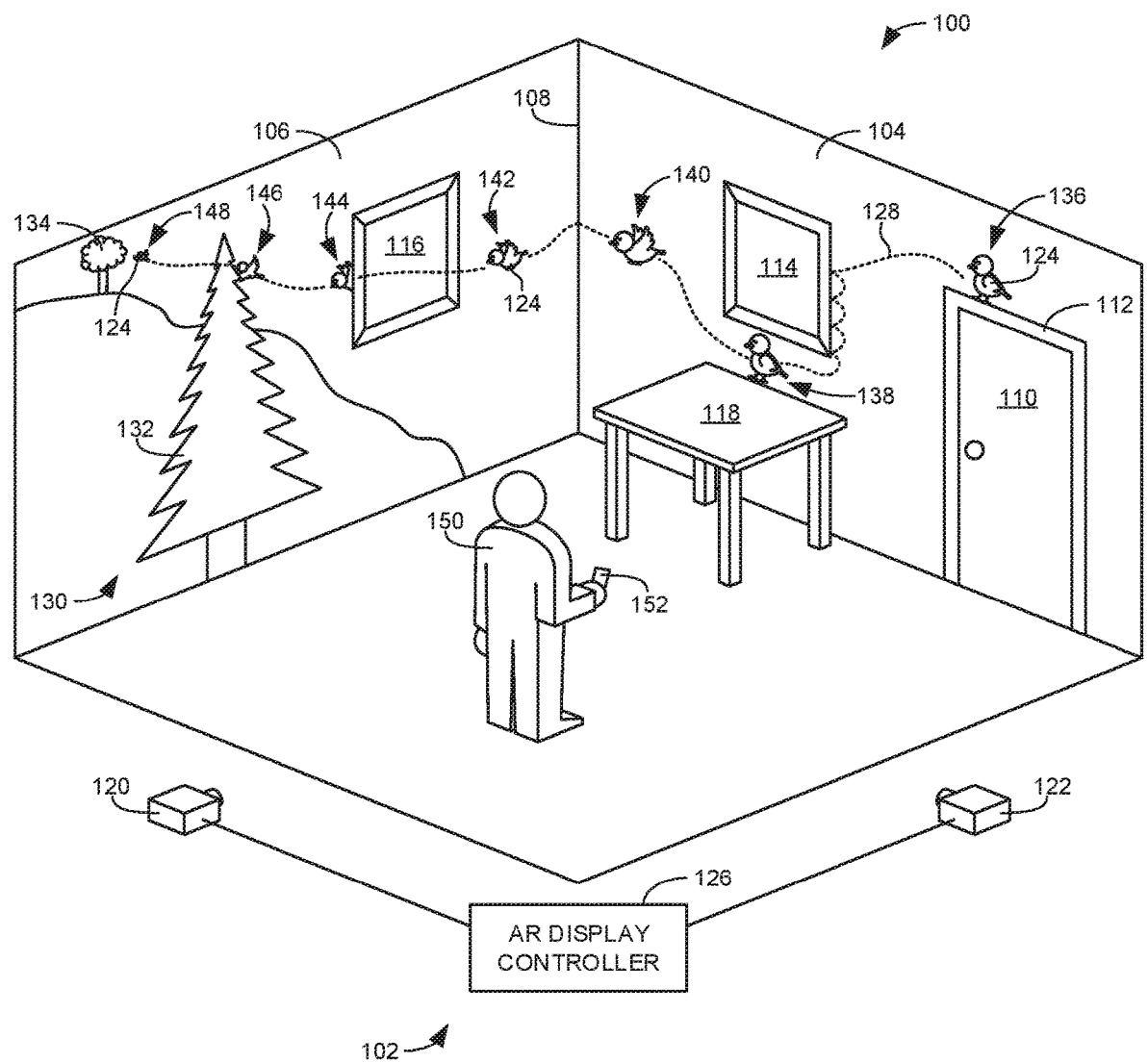
FIG. 1 illustrates an example environment in which an example AR system constructed in accordance with teachings disclosed herein may be implemented.

Augmented reality (AR) content may be rendered for display to a user in a number of different ways. In some situations, AR content is rendered on the display of a portable device (e.g., a smartphone) to overlay a rendering of the real world as captured by a camera of the portable device. In other situations, AR content may be rendered on AR glasses worn by a user so that the content is overlaid on the user's own view of the real world. In other situations, AR content may be projected directly onto surfaces in the real world to be perceived by a user. AR content is different than regular forms of visual media (e.g., television, movies, video games, etc.) either rendered on a screen or projected onto a real world surface in that AR content is typically rendered in a manner to appear to interact with and/or be perceived as an immersive aspect of the real world.

Examples disclosed herein involve AR systems that control the rendering of an AR object to move within the real world (as perceived by a user) based on user-controlled inputs. In some examples, a user may control the AR object to transition between a two-dimensional (2D) mode (also referred to as a planar mode) or a three-dimensional (3D) mode (also knowns as a depth mode). In some examples, the 2D and 3D modes are defined based on particular zones or regions within the real world. Thus, in some examples, a user controls whether the AR object is rendered in the 2D planar mode or the 3D depth mode based on which zone in the real world the AR object is located as perceived by the user. For example, a first wall may be designated as a 2D zone in which the AR object is rendered in a 2D mode, while a second wall is designated as a 3D zone in which the AR object is rendered in a 3D mode.

As used herein, a 2D mode is for rendering an AR object that is perceived as being limited to move within the plane of a real world surface associated with the corresponding 2D zone. That is, the AR object is constrained to move only in the direction of translation within the real world surface (i.e., not into or out of the surface relative to a user viewing the surface). For example, if a particular wall is defined as a 2D zone for an AR object, the object is constrained to move along the surface of the wall. In some examples, a curved wall and/or two or more non-parallel walls may be defined as a 2D zone. In such examples, the 2D zone is not a 2D surface. However, the AR object may still be rendered in a 2D mode, as defined herein, by constraining the AR object to appear to move (e.g., translate) along the surface of the walls (e.g., up, down, left, or right) with a fixed size ratio relative to the real world (e.g., does not get smaller or bigger, thereby giving the impression of movement away from or towards the user). In some examples, the movement of an AR object rendered in a 2D mode is further constrained by real world objects attached to and/or in front of a surface in the real world corresponding to the 2D zone. For example, window and/or door frames in a wall, pictures and/or other decorations on the wall, and/or tables and/or other furniture in front of the wall may all serve as obstacles to the movement of an AR object rendered in 2D mode on the wall. Accordingly, if a user wants to move an AR object along a wall corresponding to a 2D zone that includes a picture, the user would need to move the AR object around (i.e., over or under) the picture to get the AR object from one side of the picture to the other.

By contrast, as used herein, a 3D mode is for rendering an AR object that is perceived as being free to move within a 3D virtual space. In some examples, the 3D virtual space corresponds to rendered AR content and, therefore, is distinct from the real world 3D environment. For example, a 3D virtual space may correspond to a forest containing multiple trees that is rendered as AR content that appears on a wall corresponding to a 3D zone. In some examples, some of the trees are rendered to appear farther away (e.g., smaller and behind closer looking trees) to give the impression of depth. Further, in some examples, a user may control movement of the AR object within any direction within the 3D virtual space (e.g., the forest). That is, unlike in a 2D zone where the AR object is limited to moving in the plane of a corresponding real world surface (e.g., a wall), the AR object in a 3D zone may be controlled by a user to appear to move away from the user (and into the 3D virtual space) or toward the user (and out of the 3D virtual space). In some examples, the appearance of movement in the depth direction is achieved by increasing or decreasing the size of the AR object relative to the real world environment. In other examples, the AR object may remain the same size but the 3D virtual space surrounding the AR object changes to give the effect of movement (e.g., trees in the distance appear to become bigger and then move out of view as the AR object is made to appear to pass the trees moving in a direction away from the user).

In some examples, the 3D virtual space is at least partially based on the real world 3D environment. For example, a wall may be designated as a 2D zone and a window to the outside world is designated as a 3D zone. In such examples, a user may control an AR object constrained to the surface of the wall while in the 2D zone to move to the window and then appear to fly out the window upon the object transitioning to the 3D zone associated with the window. In this example, there is no need to render a 3D virtual space using additional AR content because the outside world serves as a 3D space in which an AR object may be rendered to appear to move in a depth direction.

In some examples, the way in which the AR object interacts with the real world when rendered in a 3D mode is different than when the object is rendered in a 2D mode. For example, as mentioned above, real world objects associated with the surface of a 2D zone along which an AR object is moving are treated as being within the plane of movement of the AR object. Therefore, the AR object may interact with the real world objects by bumping into them, resting upon them, hanging from below them, climbing their sides, etc. However, in some implementations of the 2D mode, the AR object is prevented from moving along a path that passes across a real world object. By contrast, in some examples, an AR object rendered in 3D mode may be controlled to follow a path that crosses a real world object because the AR object is rendered as going behind the real world object due to the perception of depth and the object being rendered to appear farther away from the user than the real world object.

Some examples disclosed herein include at least one 2D zone, at least one 3D zone, and an AR object that may transition between the 2D and 3D zones. Teachings disclosed herein may be implemented with any number of 2D zones and/or 3D zones. In some examples, the 2D zone and the 3D zone are spatially adjacent within the real world. For example, the 2D zone may correspond to a first wall of a room and the 3D zone may correspond to a second wall in the room with the first and second walls meeting at a corner of the room. In other examples, the 2D zone is temporally adjacent the 3D zone. For example, a wall may function as a 2D zone when the AR object is rendered in the 2D mode at a first point in time. At a later, second point in time, the same wall may be switched to a 3D zone so that the AR object may be rendered in a 3D mode. In some examples, the different zones may correspond to surfaces other than walls such as, for example, a ceiling, a floor, a surface of furniture (a table top, a counter top, a desk surface, etc.), and/or any other suitable surface that may be used to render the AR content. Examples disclosed herein enable the control of an AR object when being moved within the 2D mode, the 3D mode, and/or both the 2D and 3D modes. Further, examples disclosed here enable transitions in control between the 2D and 3D modes as a user controls an AR object to transition from one mode to the other.

FIG. 1 illustrates an example environment 100 in which an example AR system 102 constructed in accordance with teachings disclosed herein may be implemented. In this example, the environment 100 is a room that includes a first wall 104 and a second wall 106 that meet at a common edge 108 in a corner of the room. In the illustrated example, the first wall 104, includes a door 110 with an associated doorframe 112. A first picture 114 is hung on the first wall 104 and a second picture 116 is hung on the second wall 106. Further, as shown in FIG. 1, a table 118 is positioned against the first wall 104 underneath the first picture 114.

In the illustrated example of FIG. 1, the AR system 102 includes a first projector 120 to project AR content on the first wall 104 and a second projector 122 to project AR content on the second wall 106. In the illustrated example, the AR content projected on the first wall 104 includes an AR object 124 (corresponding to a bird in this example) that is moved along a user guided path 128 (represented by the dotted lines). The AR content projected on the second wall 106 includes the AR object 124 continuing along the path 128 as well as additional AR scenery 130 indicative of a 3D virtual space. In this example, the AR scenery 130 of the 3D virtual space includes a first tree 132 in the foreground with a second tree 134 rendered to appear at a distance on a hill in the background.

The separate instances of the AR object 124 along the path 128 are representative of the location and appearance of the AR object 124 at different points in time as it moves along the path 128. That is, the multiple instances of the AR object 124 shown in FIG. 1 are for purposes of explanation. In some examples, the AR object 124 is rendered in only one location on either the first or second walls 104, 106 at any given time. As represented by the user guided path 128 of the illustrated example, the AR object 124 begins at a first position 136 on the first wall 104 perched atop the doorframe 112. The AR object 124 is then guided to bump against an edge of the first picture 114 (as represented by the arcuate dotted line to the right of the picture in FIG. 1) before going underneath the first picture 114 and appearing to land on the table 118 at a second position 138. At a third position 140, the AR object 124 appears to be flying towards the edge 108 of the first wall 104 towards the second wall 106. At a fourth position 142, the AR object 124 is moving along the second wall 106 towards the second picture 116. At a fifth position 144, the AR object 124 appears on the opposite side of the second picture 116. At a sixth position 146, the AR object 124 is rendered as passing the first tree 132. At a seventh position 148, the AR object 124 is shown approaching the second tree 134.

In some examples, movement of the AR object 124 along the path 128 outlined above is based on input from a user 150 using a user controller 152. The user controller 152 is in communication with an AR display controller 126 to enable the AR display controller 126 to update the AR content projected by the first and second projectors 120, 122 based on the user input received via the user controller 152.

In the illustrated example of FIG. 1, the first projector 120, the second projector 122, the AR display controller 126, and the user controller 152 are separate components. In some examples, these separate components may be in communication with one another via a wired connection. In other examples, these separate components may be in communication with one another via a wireless connection. In some examples, one or more of these components may be integrated into a single device. For instances, in some examples, the AR display controller 126 may be implemented within one of the projectors 120, 122. In other examples, the AR display controller 126 may be implemented within the user controller 152.

In some examples, only a single projector is used. In some such examples, the single projector is able to rotate or otherwise move (e.g., via a gimble system) to face the appropriate direction to render the AR content. Additionally or alternatively, in some examples, the single projector is a wide angle projector that is able to render content on both the first and second walls 104, 106 simultaneously. In other examples, the AR content may be rendered without any projectors using different AR techniques. For instances, in some examples, the AR content may be rendered via display screens mounted on the respective first and second walls 104, 106. In some examples, rather than rendering the AR content on the walls 104, 106 (with projectors and/or display screens), the AR content is rendered via AR glasses worn by the user 150 so that the AR content appears, from the user's perspective, to be on the walls 104, 106 as shown in FIG. 1. In other examples, the AR content may be overlaid on an image of the environment 100 captured by camera of a mobile device carried by the user 150 (e.g., associated with the controller 152). In such examples, the AR content would appear on the respective first and second walls 104, 106 when viewed within the display of the mobile device.

In some examples, the way in which the AR object 124 interacts with objects in the real world (e.g., the door 110, the pictures 114, 116, and the table 118) and/or the way in which the AR object 124 moves based on user-input from the user controller 152 depends on whether the AR object 124 is rendered in a 2D mode or a 3D mode. In the illustrated example of FIG. 1, the first wall 104 is designated as a 2D zone in which the AR object 124 is rendered in a 2D mode. The second wall 104 is designated as a 3D zone in which the AR object 124 is rendered in a 3D mode. When the AR object 124 is rendered in a 2D mode (e.g., in the 2D zone associated with the first wall 104), the AR display controller 126 constrains the AR object 124 to move associated with translation within the plane of the first wall 104. As a result, the AR object 124 maintains a consistent size regardless of where it moves within the 2D zone.

Further, in some examples, movement of the AR object 124 is constrained by real world objects on or adjacent to the first wall 104 defining the 2D zone. For example, the AR object 124 at the first position 136 is rendered as if it is resting on or perched atop the doorframe 112 of the door 110. Further, as represented by the user guided path 128 between the first and second positions 136, 138, the AR object 124 was flown into the side of the first picture 114. However, the path 128 of the AR object bounced off the side of the first picture 114 because the picture 114, being on the first wall 104, is treated as an obstacle that the AR object must go over or under to get to the other side. In some examples, in addition to the AR display controller 126 causing the AR object 124 to bounce off the side of the first picture 114 rather than crossing over it, the AR display controller 126 may transmit a signal back to the user controller 152 to provide an output to the user 150 indicative of the AR object 124 hitting an obstacle (e.g., a haptic vibration, an audible buzz, a blinking light, etc.). In the illustrated example, the AR object 124 is guided under the first picture 114 to land on and walk across the table 118 at the second position before flying towards the edge 108 of the wall 104 at the third position.

As shown in the illustrated example, the first and second walls 104, 106 share a common edge 108. In this example, the edge 108 serves as a boundary between the 2D zone (associated with the first wall 104) and the 3D zone (associated with the second wall 106). Accordingly, once the user 150 controls the AR object 124 on the first wall 104 up to the edge 108, the AR display control 126 initiates a transition to render the AR object 124 in a 3D mode on the second wall 106. In some examples, the appearance of movement of the AR object 124 from the first wall 104 to the second wall 106 is relatively smooth and continuous. For example, as a portion of the AR object 124 moves beyond the edge 108 of the first wall 104, a corresponding portion of the AR object 124 is rendered at the corresponding location at the edge 108 on the second wall 106. In other examples, once the AR object 124 reaches the edge 108 on the first wall 104, the AR object 124 on the first wall 104 disappears (is no longer rendered) and reappears at a corresponding location on the second wall 104. In some examples, the AR object 124 is rendered on the second wall 106 before the AR object 124 is removed from rendering on the first wall 104 to provide an intuitive continuity during the transition from the first wall 104 to the second wall 106.

Once the user 150 has moved the AR object 124 to the 3D zone, the dynamics and/or control of the AR object may include movements in a depth direction extending perpendicular to the surface of the second wall 106. Accordingly, in some examples, as the user 150 controls the AR object 124 to move into an associated 3D virtual space (e.g., the AR scenery 130), the AR object 124 may decrease in size as shown at the fourth position 142 relative to the first three positions 136, 138, 140 in the 2D zone. By contrast, if the user 150 controls the AR object 124 to move toward the user, the AR object 124 may become bigger. In some examples, the interactions between real world objects and the AR object 124 when rendered in a 3D mode is different than when the AR object 124 is rendered in a 2D mode. In particular, as shown in FIG. 1, while the AR object 124 was prevented from crossing the first picture 114 in the 2D zone of the first wall 104, the AR object 124 in the 3D zone of the second wall 106 is rendered to appear as if it moves behind the second picture 116. In some examples, the AR object 124 may momentarily disappear (stop being rendered) as the user 152 causes the AR object 124 to traverse the second picture 116. Thus, as shown in the illustrated example, only the front portion of the AR object is shown at the fifth position 144 as the AR object 124 is rendered to appear to come out from behind the second picture 116. In other examples, the AR object 124 may be rendered continuously as it traverses across the second picture 116. In the illustrated example, as the user 150 controls the AR object 124 towards the sixth position 146, the AR object 124 continues to become smaller to give the effect of moving farther into the 3D virtual space. In some examples, this effect is enhanced by rending the AR object 124 as passing behind other AR content such as, for example, the first tree 132 as shown in FIG. 1. In other circumstances, the user 150 may control the AR object 124 to appear to come close to the user 150 to pass in front of the first tree 132. As shown in FIG. 1, the AR object 124 is rendered very small at the seventh position 148 to give the impression that the AR object 124 is far off in the distance.

In some examples, the appearance of movement in a depth direction (e.g., farther into the AR scenery 130) is accomplished by updated the AR scenery 130 so that the rendered view follows the AR object 124. For example, rather than the AR object 124 getting smaller as it passes the first tree 132 and approaches the second tree 134, in some examples, the AR object 124 may stay substantially the same size while the trees 132, 134 are rendered to appear to get larger as they get closer and then pass from view as the AR object 124 passes the position of the trees within the 3D virtual space. In some such examples, the AR object 124 may not only maintain a consistent size but be placed in a consistent position within the 3D zone (e.g., at the center of the wall 106) with the scenery changing as the user 150 controls the AR object 124 to move around. In some such examples, to facilitate an intuitive transition from the AR object 124 at the edge 108 of the first wall 104 to the center of the second wall 106, the AR object 124 may be displayed automatically (e.g., without user input) traversing the second wall 106 from a location adjacent the point of transition where the AR object 124 reached the edge 108 on the first wall 104 to the center position of the second wall 106.

In some examples, the boundaries for 2D and 3D zones correspond to edges of different walls (e.g., where the wall meets the floor, the ceiling, and/or another wall). However, the boundaries for the 2D and 3D zones may be defined in any suitable manner. In some examples, the same area may be configured as either a 2D zone or a 3D zone based on user input. For example, the first wall 104 may be designated as a 2D zone at a first point in time and then the user may toggle to a 3D zone at a second point in time.

Figure 2:
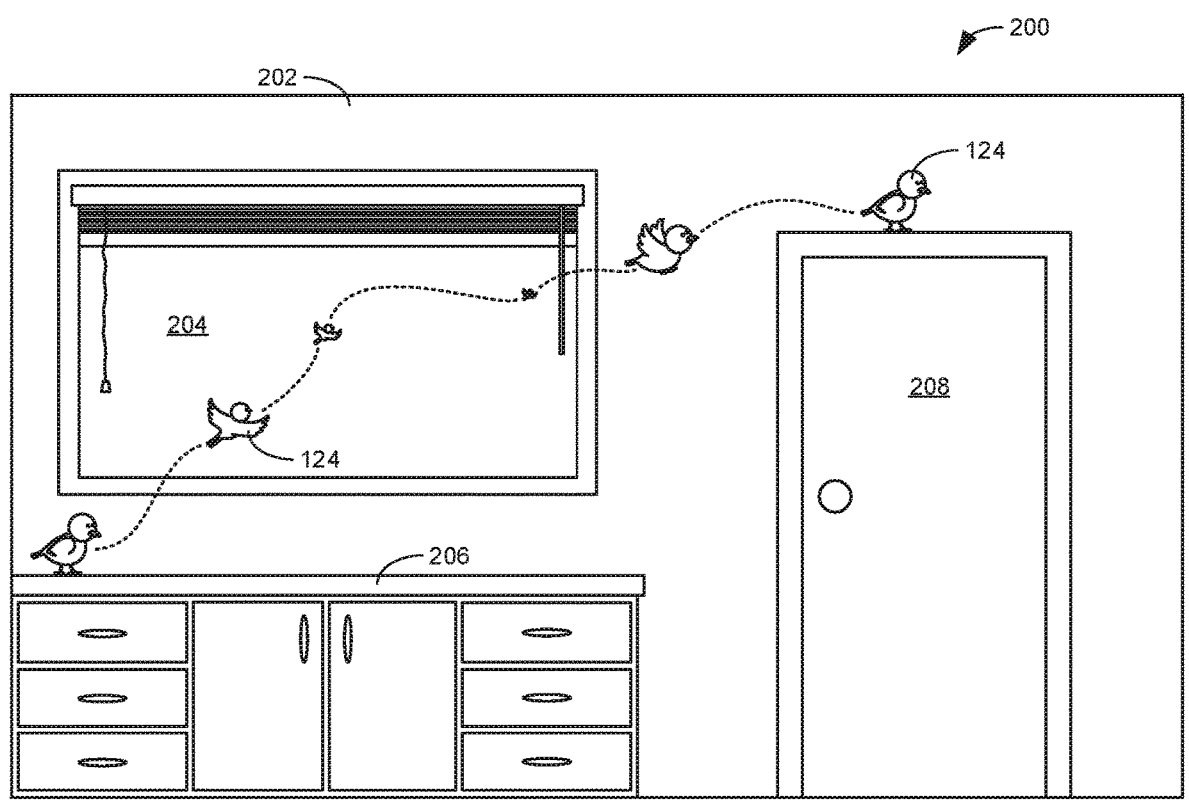
FIG. 2 illustrates another example environment in which the example AR system of FIG. 1 may be implemented.

In some examples, a single wall may be divided into separate portions with one portion being a 2D zone and a second portion being a 3D zone. In some examples, the division of a single wall into separate zone may be arbitrarily defined (e.g., done a midpoint of the wall). In other examples, the division of a single wall may be based on particular objects associated with the wall. As a specific example, FIG. 2 illustrates another example environment 200 in which the example AR system 102 of FIG. 1 may be implemented to render AR content. In the illustrated example of FIG. 2, only a single wall 202 is shown. The wall 202 includes a window 204 with a cabinet 206 positioned underneath. Additionally, the wall 202 of FIG. 2 includes a door 208. In this example, the window 204 is designated as a 3D zone with the rest of the wall 202 being designated as a 2D zone. Accordingly, as shown in the illustrated example, the AR object 124 is the same size regardless of its location on the wall 202 (e.g., whether standing on the cabinet 206, perched on the frame of the door 208, or moving therebetween. By contrast, as the AR object 124 is controlled by a user to transition into the 3D zone associated with the window 204, the AR object 124 may decrease in size to give the impression that the object is moving away into world out the window 204. In some examples, where the AR object 124 is rendered by a projector, the window 204 may be treated to have a semi-transparent surface that enables projected images to be visible to a user.

As shown in the illustrated example, the AR object 124 is very small (representative of being far in the distance) just before it reaches the edge of the 3D zone (e.g., the window frame) to transition back to the 2D zone with the full size AR object 124 rendered for the 2D mode. In some examples, this sudden transition from a small and seemingly distant AR object 124 in the 3D zone to a large and close AR object 124 on the other side of the boundary line is visually disruptive to users. Accordingly, in some examples, the AR display controller 126 may prevent a user from controlling the AR object 124 to transition from a 3D zone to a 2D zone unless the perceived depth of the AR object 124 within the 3D zone is comparable to the fixed depth of the AR object 124 when rendered in an adjacent 2D zone. Thus, in some such examples, if a user controls the AR object 124 to appear to move far into the distance in a 3D zone, the user would need to bring the AR object 124 back up close before transitioning to the 2D zone. In other examples, the position of depth of AR object 124 within a 3D virtual space is ignored and transitions between boundaries are allowed at any time.

Figure 3:
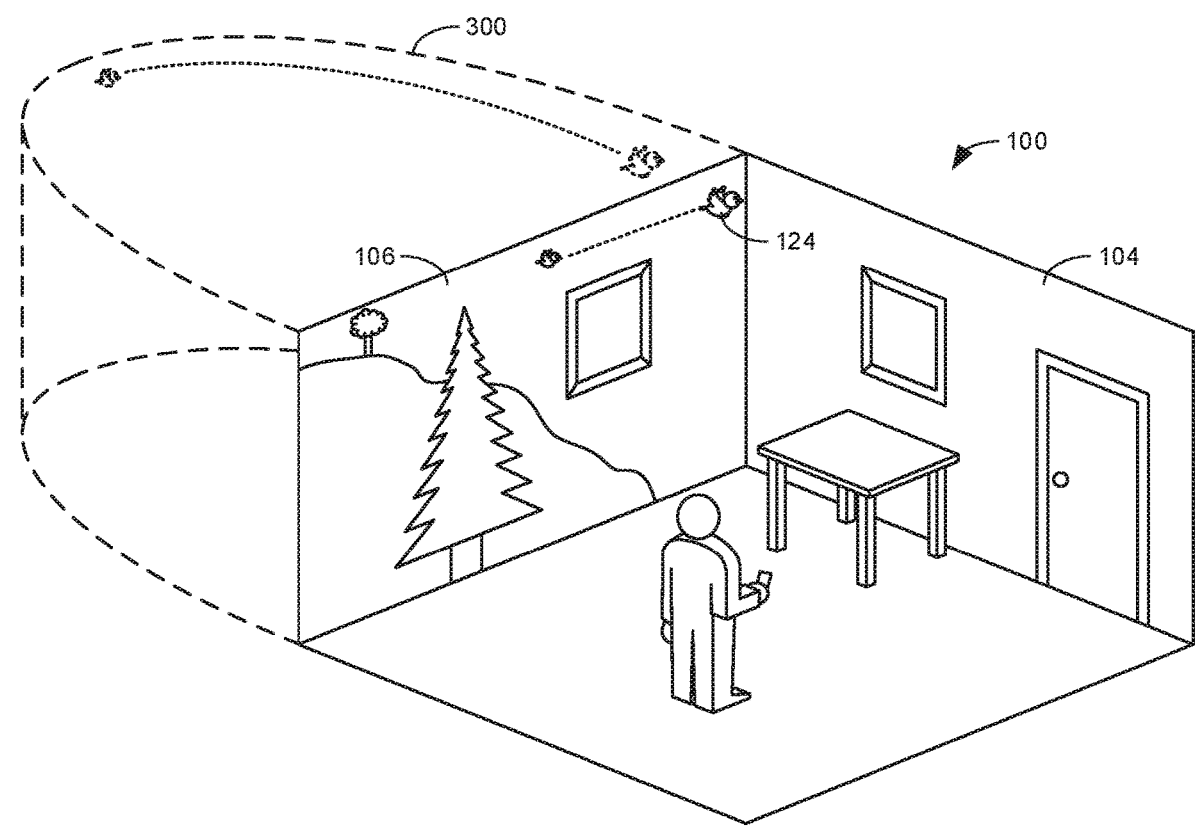
FIG. 3 illustrates an example shape for a 3D virtual space rendered by the example AR system of FIG. 1.

In other examples, the depth to which an AR object 124 may be appeared to move within a 3D zone increases towards the center of the 3D zone but is limited closer to boundaries with an adjacent 2D zone. That is, in some examples, as a user controls an AR object 124 from the center of 3D zone (e.g., the center of the second wall 106 of FIG. 1) towards an edge of a 3D zone (e.g., the edge 108 of the second wall 106 adjacent the first wall 104 of FIG. 1), the AR display controller 126 automatically causes the AR object 124 to appear to move towards the user so that by the time the AR object 124 reaches the boundary of the 3D zone, the AR object 124 may be located at a depth comparable to the fixed depth of a 2D zone. In some examples, this is accomplished by defining a shape for the 3D virtual space constraining the perceived movement of the AR object 124 therein. As an example, FIG. 3 illustrates an example a 3D virtual space 300 associated with the 3D zone of the second wall 106 of the example environment 100 of FIG. 1. In this example, the 3D virtual space 300 has shape generally corresponding to a parabolic cylinder with the farthest depth into the 3D virtual space 300 corresponding to the center of the second wall 106. As the AR object 124 is controlled to either the left or the right, the movement of the AR object is constrained by the outer wall of the 3D virtual space 300. As a result, the AR object 124 will curve back towards the plane of the second wall 106 as the AR object approaches the edges of the wall as represented in FIG. 3. This enables the AR object to be brought into continuity of depth with the 2D zone associated with the first wall 104 without needing the user to manually control the AR object back when transitioning from the 3D zone to the 2D zone. While an example parabolic cylinder is shown in the illustrated example, the shape of the 3D virtual environment may be any suitable shape (e.g., conical, spherical, etc.) and may depend on the shape of the surface(s) in the real world corresponding to the 3D zone and/or where 2D zones are located relative to the 3D zone.

Figure 4:
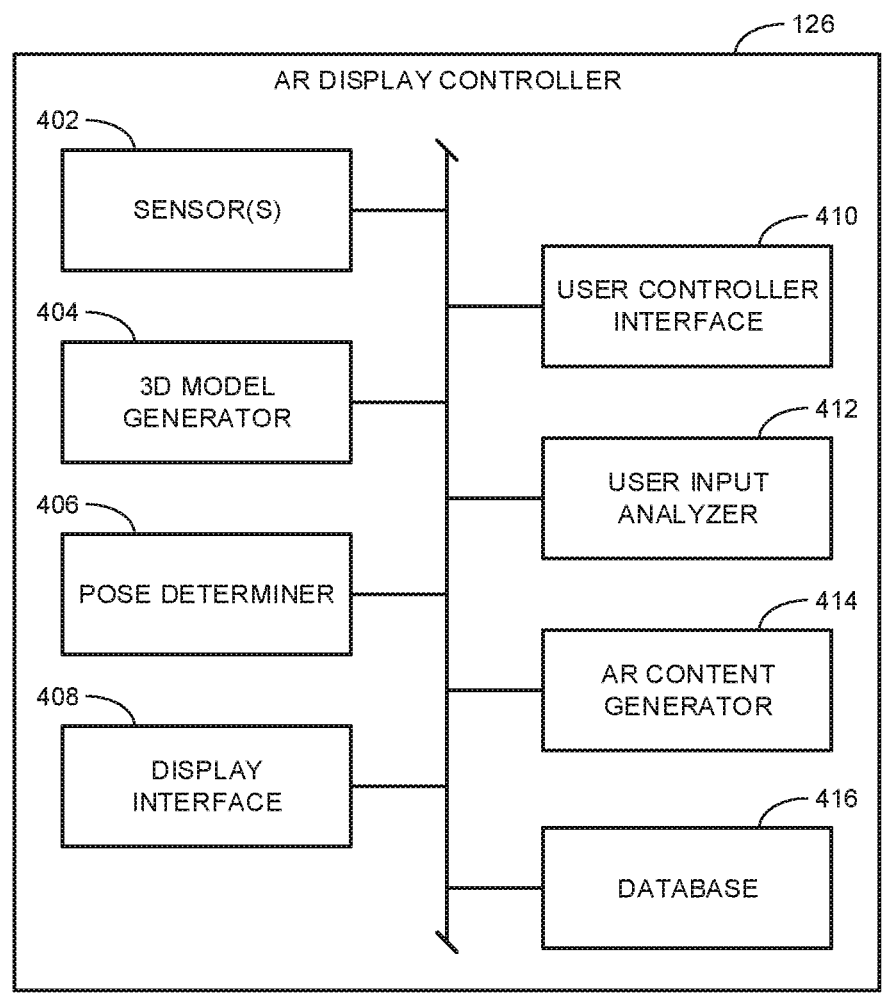
FIG. 4 is a block diagram illustrating an example implementation of the example AR display controller of FIG. 1.

FIG. 4 is a block diagram illustrating an example implementation of the AR display controller 126 of FIG. 1. The example AR display controller 126 includes one or more example sensor(s) 402, an example 3D model generator 404, an example pose determiner 406, an example display interface 408, an example user controller interface 410, an example user input analyzer 412, an example AR content generator 414, and an example database 416.

The one or more sensor(s) 402 may be implemented to detect the physical contours of objects in the real world in which the AR display controller 126 is to operate. For example, the sensor(s) 402 may include cameras, a 3D laser scanning system (e.g., RPLIDAR technology), and/or other sensors to detect the first and second walls 104, 106 of FIG. 1 (as well as the floor and ceiling defining the contours of the walls 104, 106). Further, in some examples, the sensor 402 are capable of detecting the door 110, the first and second pictures 114, 116, the table 118, and/or any other objects within the room. In some examples, where the AR display controller 126 is implemented in a portable device (e.g., in connection with the user controller 152 of FIG. 1), the sensor(s) 402 may also include an accelerometer, a gyroscope, a magnetometer, an infrared proximity and/or depth sensor, and the like, to gather the movement, position, and/or orientation information associated with the AR display controller 126. Additionally or alternatively, in some examples, the sensors 402 may include a microphone to receive voice commands from the user 150, and/or other sensors to receive feedback from the user 150 and/or otherwise determine the behavior and/or activity of the user (e.g., to enable gesture based control of the AR content). In some examples, one or more of the sensors 402 described above may be omitted from the AR display controller 126. In some such examples, the sensors 402 may be implemented in a separate device and the output provided to the AR display controller 126 via a communications interface.

In the illustrated example of FIG. 4, the 3D model generator 404 generates a 3D spatial model of the environment 100 in which the AR system 102 is to be implemented. In some examples, where, for example, the AR content is rendered from one or more fixed projectors 120, 122, the 3D model generation may occur and/or be hardcoded into the AR display controller at the time of installation. In some such examples, the 3D model generator 404 may be omitted from the AR display controller 126 and implemented in a separate device with the output provided to the AR display controller 126. In other situations, where, for example, the AR system 102 is incorporated into a portable device (e.g., a smartphone or a head-mounted display) such that the AR system 102 may be implemented in multiple different locations, the 3D model generator 404 may analyze sensor data to generate a 3D spatial model of an environment associated with the AR system 102 at any given point in time.

The example pose determiner 406 of the illustrated example analyzes outputs from the one or more sensor(s) 402 to determine a position and an orientation of the AR display controller 126 within an associated environment in which the AR system 102 is being implemented. In examples where the AR content is generated based on fixed position projectors, the pose determiner 406 may be omitted.

In FIG. 4, the example display interface 408 of the AR display controller 126 communicates and/or interacts with the projectors 120, 122 to provide the AR content to be rendered on the respective first and second walls 104, 106. In other examples, where the AR display controller 126 is incorporated into a portable device, the display interface 408 communicates with an associated display of the portable device.

In the illustrated example, the user controller interface 410 communicates with the user controller 152. In some examples, the user controller interface 410 receives user input obtained by the controller 152. In some examples, the user controller interface 410 transmits information to the controller 152 to enable the controller 152 to provide suitable information to the user. For example, the controller 152 may be equipped with a haptic generator to produce vibrations that may be sensed by the user associated with the user's control of an AR object 124. In some examples, the controller 152 may produce other types of signals (e.g., audible and/or visual) based on information communicated via the user controller interface 410 that may be perceived by the user 150 to enhance the immersive experience of the user.

The example user input analyzer 412 of the illustrated example analyzes user inputs received via the user controller interface 410 to determine how AR content rendered for the user 150 is to be changed. In some examples, user inputs may define when the AR object 124 is to be rendered in a 2D mode or a 3D mode (e.g., toggle a particular surface in the real world between a 2D zone and a 3D zone). In some examples, the user inputs define the direction in which the user 150 desires an AR object (e.g., the AR object 124 of FIGS. 1-3) to move within a 3D virtual space and/or with respect to objects in the real world. In some examples, the same user inputs may be interpreted differently depending on whether the AR object 124 is currently rendered in a 2D mode or a 3D mode. For instance, in some examples, a user input indicating a movement of the AR object 124 to the left or right may cause the AR object 124 to move directly to the left or right in a 2D mode unless the AR object 124 is obstructed by an object in the real world associated with the corresponding 2D zone. By contrast, the same user input (movement to the left or right) for an AR object in a 3D mode may cause the object to move left or right, but also curve towards an adjacent 2D zone based on a defined shape of the 3D virtual space in which the AR object 124 is being moved.

In the illustrated example of FIG. 4, the AR content generator 414 determines the AR content to be displayed (e.g., by the projectors 120, 122) based on the user input analyzed by the user input analyzer 412. For example, the AR content generator 414 generates the AR object 124 to be rendered and defines the location within the environment 100 where the AR object 124 is to be rendered. Further, in some examples, the AR content generator 414 determines the content to be rendered based on the current position of the AR object 124 and the current user control inputs relative to objects in the real world as defined by a model of the real world generated by the 3D model generator 404. In some such examples, the rules by which the AR content generator 414 controls the rendering of the AR object 124 relative to the real world depends on whether the AR object 124 is currently being rendered in a 2D zone or a 3D zone.

The example database 416 of the illustrated example stores relevant information to enable the implementation of the other blocks of FIG. 4 described above. For example, the database 416 may store the 3D spatial model generated by the 3D model generator 404. Further, in some examples, the database 416 stores visual elements corresponding to the AR object 124 as well as other AR content such as the AR scenery 130 shown in FIG. 1. Further, the database 416 may store the rules governing how movement of the AR object 124 is to occur based on user-input depending on whether the AR object is currently rendered in a 2D mode or a 3D mode.

While an example manner of implementing the example AR display controller 126 of FIG. 1 is illustrated in FIG. 4, one or more of the elements, processes and/or devices illustrated in FIG. 4 may be combined, divided, re-arranged, omitted, eliminated and/or implemented in any other way. Further, the one or more example sensor(s) 402, the example 3D model generator 404, the example pose determiner 406, the example display interface 408, the example user controller interface 410, the example user input analyzer 412, the example AR content generator 414, the example database 416 and/or, more generally, the example AR display controller 126 of FIG. 1 may be implemented by hardware, software, firmware and/or any combination of hardware, software and/or firmware. Thus, for example, any of the one or more example sensor(s) 402, the example 3D model generator 404, the example pose determiner 406, the example display interface 408, the example user controller interface 410, the example user input analyzer 412, the example AR content generator 414, the example database 416 and/or, more generally, the example AR display controller 126 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the one or more example sensor(s) 402, the example 3D model generator 404, the example pose determiner 406, the example display interface 408, the example user controller interface 410, the example user input analyzer 412, the example AR content generator 414, and/or the example database 416 is/are hereby expressly defined to include a non-transitory computer readable storage device or storage disk such as a memory, a digital versatile disk (DVD), a compact disk (CD), a Blu-ray disk, etc. including the software and/or firmware. Further still, the example AR display controller 126 of FIG. 1 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
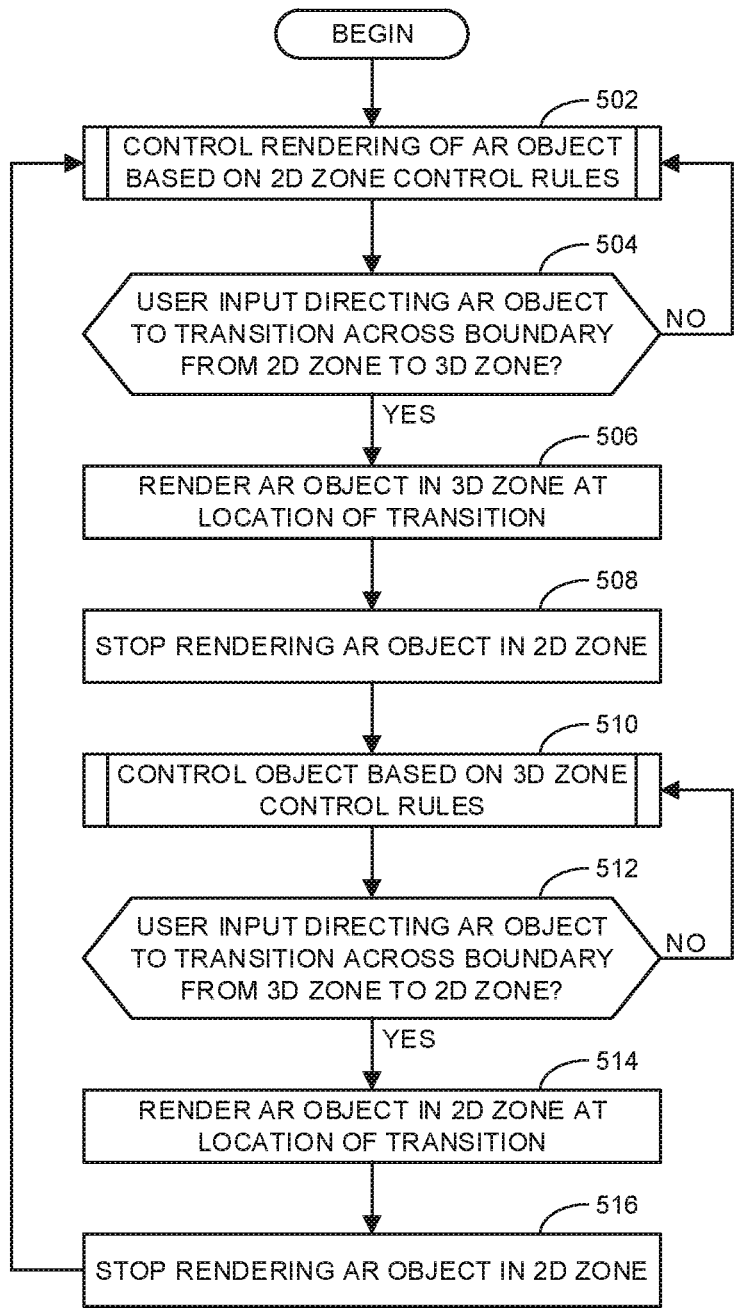
FIGS. 5-7 are flowcharts representative of example machine readable instructions which may be executed to implement the example AR display controller of FIGS. 1 and/or 4.
Figure 6:
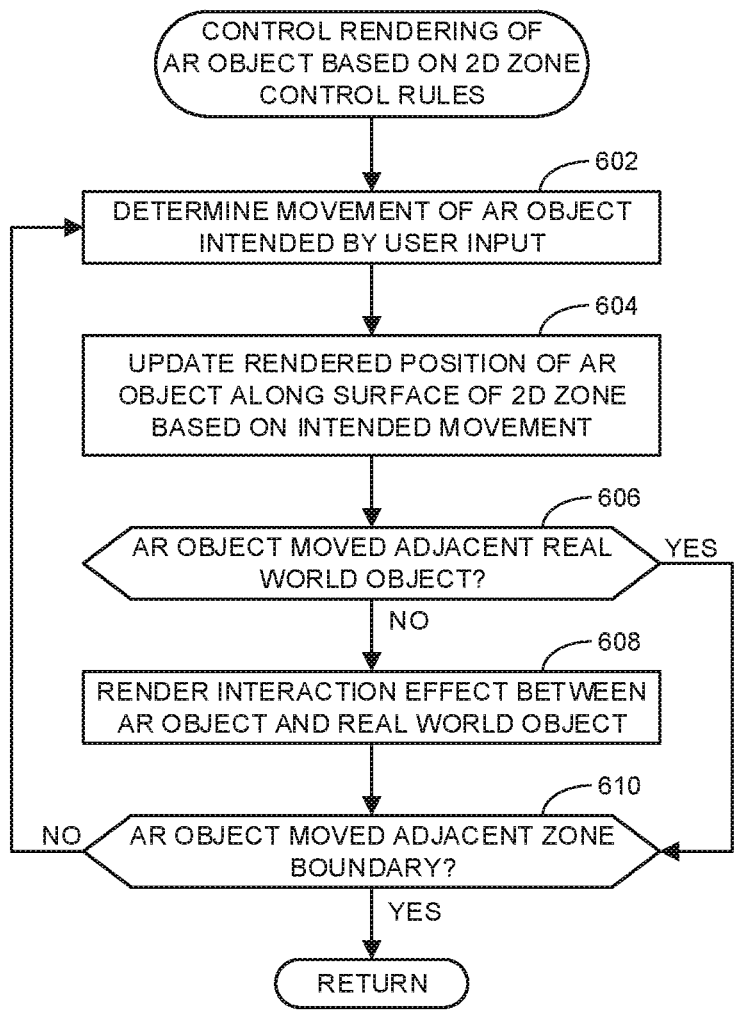
Figure 7:
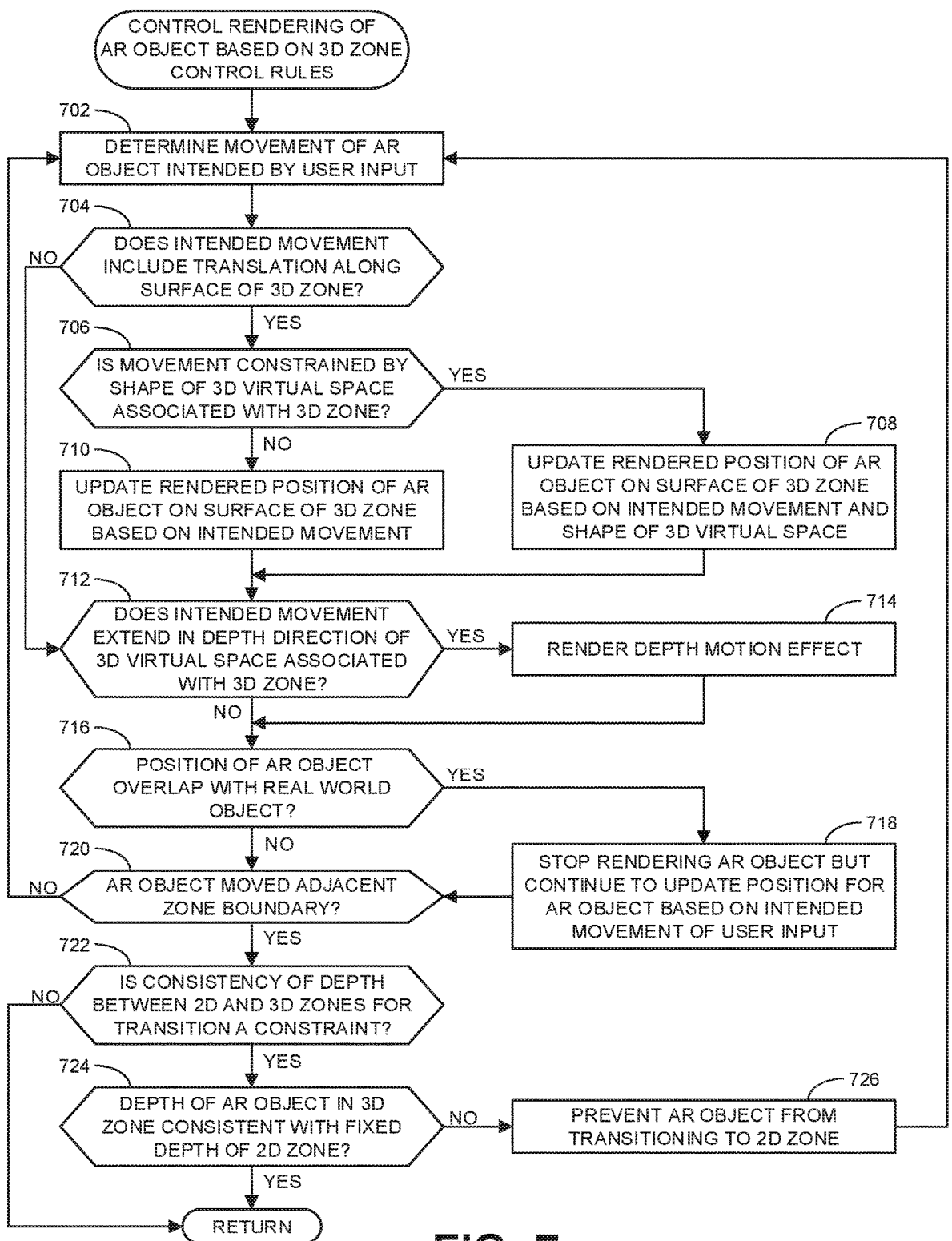

Flowcharts representative of example hardware logic, machine readable instructions, hardware implemented state machines, and/or any combination thereof for implementing the AR display controller 126 of FIGS. 1 and/or 4 is shown in FIGS. 5-7. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 8, many other methods of implementing the example AR display controller 126 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program of FIG. 5 begins at block 502 where the example AR content generator 414 controls rendering of an AR object (e.g., the AR object 124 of FIGS. 1-3) based on 2D zone control rules. Further detail regarding the implementation of block 502 is provided below in connection with FIG. 6. At block 504, the example user input analyzer 412 determines whether user input is directing the AR object 124 to transition across a boundary (e.g., the edge 108 in FIG. 1) from a 2D zone (e.g., associated with the first wall 104 in FIG. 1) to a 3D zone (e.g., associated with the second wall 106 in FIG. 1). If not, control returns to block 502. If so, control advances to block 506 where the example AR content generator 414 renders the AR object 124 in the 3D zone at the location of the transition. At block 508, the AR content generator 414 stops rendering the AR object 124 in the 2D zone. In some examples, blocks 506 and 508 are implemented substantially simultaneously. In some examples, the implementation of block 506 and 508 are synchronized so that as an increasing portion of the AR object 124 is rendered in the 3D zone at the boundary line, a corresponding portion of the AR object 124 in the 2D zone is no longer rendered as the AR object 124 is made to appear to move to the 3D zone. In some examples, there may be a delay between block 506 and block 508 so that the AR object 124 appears momentarily in both the 2D zone and the 3D zone. In some examples, the delay may be a fixed threshold period of time. In some examples, the period of time of the delay may be based on user input. For instance, in some examples, the AR object 124 may be rendered in both the 2D zone and the 3D zone and remain in that state until the user either confirms or denies the intent to transition to the other zone.

Thereafter, at block 510, the example AR content generator 414 controls rendering of the AR object 124 based on 3D zone control rules. Further detail regarding the implementation of block 510 is provided below in connection with FIG. 7. At block 512, the example user input analyzer 412 determines whether user input is directing the AR object 124 to transition across the boundary from the 3D zone to the 2D zone. If not, control returns to block 510. If so, control advances to block 514 where the example AR content generator 414 renders the AR object 124 in the 2D zone at the location of the transition. At block 516, the AR content generator 414 stops rendering the AR object 124 in the 3D zone. Thereafter, control returns to block 502 to continue through the example process of FIG. 5.

As mentioned above, FIG. 6 provides an example implementation of block 502 of FIG. 5. The example process of FIG. 6 begins at block 602 where the example user input analyzer 412 determines movement of the AR object 124 intended by user input. At block 604, the example AR content generator 414 updates the rendered position of the AR object along the surface of the 2D zone based on the intended movement. At block 606, the example AR content generator 414 determines whether the AR object is being moved adjacent a real world object. If so, control advances to block 608 where the example AR content generator 414 renders an interaction effect between the AR object and the real world object. In some examples, the nature of interaction between the AR object 124 and the real world object depends upon what the AR object is and the characteristics defining how the AR object is to behave when interacting with real world objects. For instance, in the illustrated examples of FIGS. 1-3, the AR object 124 is a bird that can fly around and, thus, either bumps into real world objects while flying or lands upon the real world objects. As another example, the AR object 124 could be a lizard that is made to appear to leap from one object to another and able to climb the sides of the real world objects and/or dangle from the bottom of such objects. Thereafter, control advances to block 610.

Returning to block 606, if the example AR content generator 414 determines that the AR object 124 is not being moved adjacent a real world object, control advances directly to block 610. At block 610, the example AR content generator 414 determines if the AR object 124 is being moved adjacent a zone boundary. If so, the example process of FIG. 6 ends and returns to the process of FIG. 4 to determine whether to transition to a 3D zone (block 504 of FIG. 5). If, however, the example AR content generator 414 determines that the AR object 124 is not being moved adjacent a zone boundary, control returns to block 602 to continue controlling the rendering of the AR object 124 based on the 2D zone control rules.

As mentioned above, FIG. 7 provides an example implementation of block 512 of FIG. 5. The example process of FIG. 7 begins at block 702 where the example user input analyzer 412 determines movement of the AR object 124 intended by user input. At block 704, the example AR content generator 414 determines whether the intended movement includes translation along a surface of the 3D zone (e.g., the surface of the second wall 106 of FIG. 1). If so, control advances to block 706, where the example AR content generator 414 determines whether the intended movement is constrained by the shape of a 3D virtual space associated with the 3D zone. If so, control advances to block 708 where the example AR content generator 414 updates the rendered position of the AR object 124 on the surface of the 3D zone based on the intended movement and the shape of the 3D virtual space. Thereafter, control advances to block 712. If the example AR content generator 414 determines that the intended movement is not constrained by the shape of a 3D virtual space associated with the 3D zone (block 706), control advances to block 710. At block 710, the example AR content generator 414 updates the rendered position of the AR object 124 on the surface of the 3D zone based on the intended movement. Thereafter, control advances to block 712. Returning to block 704, if the example AR content generator 414 determines that the intended movement does not include translation along a surface of the 3D zone, control advances directly to block 712.

At block 712, the example AR content generator 414 determines whether the intended movement extends in a depth direction of the 3D virtual space associated with the 3D zone. In some examples, this depth direction may arise do to the constraints imposed by the shape of the 3D virtual space at block 708. If the intended movement does extend in the depth direction, control advances to block 714 where the example AR content generator 414 renders a depth motion effect. In some examples, the depth motion effect includes increasing or decreasing the size of the AR object 124 depending on whether the movement is to appear out of or farther into the 3D virtual space. In other examples, the depth motion effect includes change the surrounding AR scenery (e.g., the AR scenery 130 of FIG. 1) so as to represent the changing view when moving along with the AR object 124. After rendering the depth motion effect, control advances to block 716. If the example AR content generator 414 determines that the intended movement does not extend in the depth direction (block 712), control advances directly to block 716.

At block 716, the example AR content generator 414 determines whether the position of the AR object 124 overlaps with a real world object. If so, control advances to block 718 where the example AR content generator 414 stops rendering the AR object but continues to update the position of the AR object based on the intended movement of the user input. Thereafter, control advances to block 720. If the example AR content generator 414 determines that the position of the AR object 124 does not overlap with a real world object (block 716), control advances directly to block 720. At block 720, the example AR content generator 414 determines if the AR object 124 is being moved adjacent a zone boundary. If so, control advances to block 722. Otherwise, control returns to block 702 to continue controlling the rendering of the AR object 124 based on the 3D zone control rules.

At block 722, the example AR content generator 414 determines whether consistency of depth between the 2D and 3D zones is a constraint. If so, control advances to block 724 where the example AR content generator 414 determines whether the depth of the AR object in the 3D zone is consistent with the fixed depth of the 2D zone. In some examples, the depths are considered consistent within a particular threshold of difference. If the depth of the AR object 124 in the 3D zone is not consistent with the 2D zone, control advances to block 726, where the example AR content generator 414 prevents the AR object from transitioning to the 2D zone. Thereafter, control returns to block 702. If the example AR content generator 414 determines that the depth of the AR object in the 3D zone is consistent with the 2D zone (block 724), the example process of FIG. 7 ends and control returns to continue the process of FIG. 5. Returning to block 722, if the example AR content generator 414 determines that consistency of depth between the 2D and 3D zones is not a constraint, the example process of FIG. 7 ends and control returns to continue the process of FIG. 5.

Figure 8:
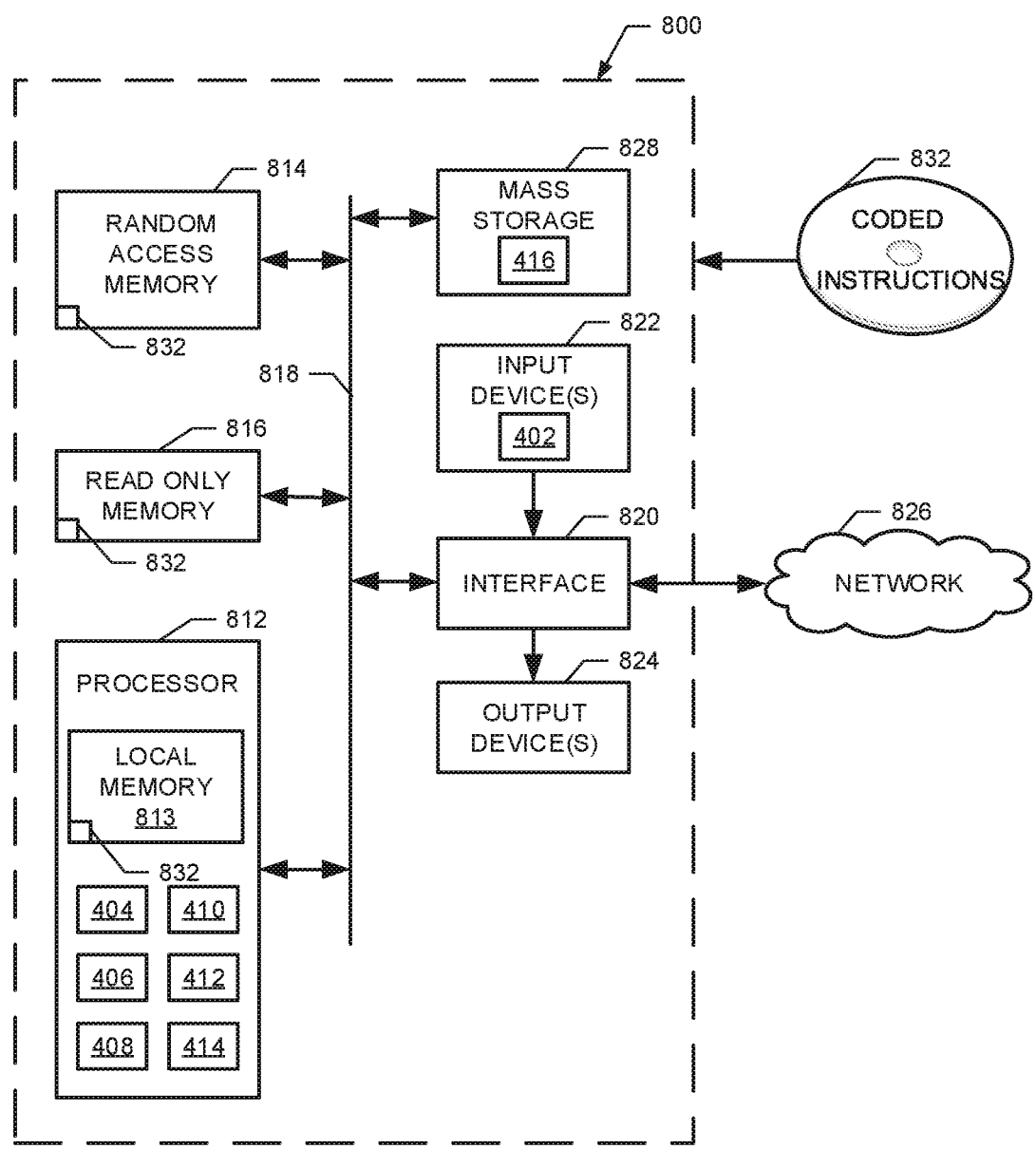
FIG. 8 is a block diagram of an example processor platform structured to execute the instructions of FIGS. 5-7 to implement AR display controller of FIGS. 1 and/or 4.

FIG. 8 is a block diagram of an example processor platform 800 structured to execute the instructions of FIGS. 5-7 to implement the example AR display controller 126 of FIGS. 1 and/or 4. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example 3D model generator 404, the example pose determiner 406, the example display interface 408, the example user controller interface 410, the example user input analyzer 412, and the example AR content generator 414.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system. In this example, the input device(s) 822 include the one or more sensors 402.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives. In this example, the mass storage device implements the example database 416.

The machine executable instructions 832 of FIGS. 5-7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that enable the user-controlled transition of a rendered AR object between 2D and 3D zones of a real world environment. Examples disclosed herein provide for intuitive transitions that preserve continuity of the AR object as it transitions from one zone to another to enhance a user experience for a user moving the AR object in the respective zones. AR content (including the AR object) may be rendered using any suitable AR technology such as, for example, one or more projectors on a surface of the real world environment in which the AR content is to interact, via display screen of a portable device, or via AR glasses worn by the user.

Example 1 includes an apparatus comprising a user input analyzer to determine an intended movement of an AR object relative to a first zone of a real world environment and a second zone of the real world environment, and an AR content generator, in response to user input, to render an appearance of movement of the AR object in the first zone based upon a first set of rules, and render the AR object in the second zone, movement of the AR object in the second zone based on a second set of rules different than the first set of rules.

Example 2 includes the apparatus of example 1, wherein the first set of rules is to constrain the appearance of movement of the AR object in the first zone to translation within a surface associated with the first zone, the second set of rules to enable the appearance of movement of the AR object in a depth direction extending perpendicular to a surface associated with the second zone.

Example 3 includes the apparatus of example 2, wherein, in response to the user input to move the AR object beyond a boundary of the first zone, the AR content generator is to render the AR object in the second zone at a point of transition corresponding to a location of the AR object rendered in the first zone, and remove the rendering of the AR object in the first zone, the boundary dividing the first zone from the second zone.

Example 4 includes the apparatus of example 3, wherein the AR content generator is to delay the removal of the rendering of the AR object in the first zone for a period of time after the rendering of the AR object in the second zone.

Example 5 includes the apparatus of any one of examples 2-4, wherein the AR content generator is to generate the appearance of movement of the AR object in the first zone by maintaining the AR object at a consistent size as the AR object moves.

Example 6 includes the apparatus of any one of examples 2-5, wherein the AR content generator is to generate the appearance of movement of the AR object in the depth direction in the second zone by altering a size of the AR object as the AR object moves.

Example 7 includes the apparatus of any one of examples 2-6, wherein the AR content generator is to render an AR scene in the second zone, and generate the appearance of movement of the AR object in the depth direction by altering the AR scene.

Example 8 includes the apparatus of any one of examples 2-7, wherein, in response to the user input to move the AR object to an area corresponding to a real world object associated with the first zone, the AR content generator is to render an interaction effect between the AR object and the real world object based on the first set of rules.

Example 9 includes the apparatus of example 8, wherein the AR content generator is to prevent the AR object from moving into the area corresponding to the real world object.

Example 10 includes the apparatus of any one of examples 2-9, wherein, in response to the user input to move the AR object to an area corresponding to a real world object associated with the second zone, the AR content generator is to track a user-intended position of the AR object in the area corresponding to the real world object, and remove a rendering of the AR object while the user-intended position overlaps the area corresponding to the real world object.

Example 11 includes the apparatus of any one of examples 2-10, wherein the second set of rules constrain an appearance of movement of the AR object in the second zone to remain within boundaries of a 3D virtual space.

Example 12 includes the apparatus of example 11, wherein, in response to the user input to move the AR object to a virtual position beyond the boundaries of the 3D virtual space, the AR content generator is to automatically generate the appearance of movement of the AR object in the depth direction along a boundary of the 3D virtual space.

Example 13 includes the apparatus of any one of examples 1-12, wherein the first zone and the second zone correspond to a common surface in the real world environment.

Example 14 includes the apparatus of any one of examples 1-13, wherein the first zone is adjacent the second zone with a boundary therebetween.

Example 15 includes the apparatus of example 14, wherein the first zone corresponds to a first wall and the second zone corresponds to a second wall, the boundary corresponding to a corner where the first and second walls meet.

Example 16 includes the apparatus of example 14, wherein the first zone corresponds to a wall and the second zone corresponds to a window in the wall, the boundary corresponding to a perimeter of the window.

Example 17 includes the apparatus of example 14, wherein the first zone corresponds to a wall and the second zone corresponds to at least one of a floor or a ceiling, the boundary corresponding to a corner where the wall and the at least one of the floor or the ceiling meet.

Example 18 includes the apparatus of any one of examples 1-17, further including a first projector, the AR content generator to render the AR object in the first zone via the first projector, and a second projector, the AR content generator to render the AR object in the second zone via the second projector.

Example 19 includes the apparatus of example 18, further including a user controller to receive the user input from a user.

Example 20 includes a non-transitory computer readable medium comprising instructions that, when executed, cause one or more machines to at least render an AR object to appear in a first zone of a real world environment, in response to user input move the rendering of the AR object relative to the real world environment based upon a first set of rules, and render the AR object in a second zone of the real world environment, movement of the AR object in the second zone based on a second set of rules different than the first set of rules.

Example 21 includes the non-transitory computer readable medium of example 20, wherein the first set of rules is to constrain an appearance of movement of the AR object in the first zone to translation within a surface associated with the first zone, the second set of rules to enable the appearance of movement of the AR object in a depth direction extending perpendicular to a surface associated with the second zone.

Example 22 includes the non-transitory computer readable medium of example 21, wherein, in response to the user input to move the AR object beyond a boundary of the first zone, the instructions, in response to the AR object moving to the boundary in the first zone, further causing the one or more machines to render the AR object in the second zone at a point of transition corresponding to a location of the AR object rendered in the first zone, and remove the rendering of the AR object in the first zone, the boundary dividing the first zone from the second zone.

Example 23 includes the non-transitory computer readable medium of example 22, wherein the instructions further cause the one or more machines to delay the removal of the rendering of the AR object in the first zone for a period of time after the rendering of the AR object in the second zone.

Example 24 includes the non-transitory computer readable medium of any one of examples 20-23, wherein the instructions further cause the one or more machines to generate the appearance of movement of the AR object in the first zone by maintaining the AR object at a consistent size as the AR object moves.

Example 25 includes the non-transitory computer readable medium of any one of examples 20-24, wherein the instructions further cause the one or more machines to generate the appearance of movement of the AR object in the depth direction in the second zone by altering a size of the AR object as the AR object moves.

Example 26 includes the non-transitory computer readable medium of any one of examples 20-25, wherein the instructions further cause the one or more machines to render an AR scene in the second zone, and generate the appearance of movement of the AR object in the depth direction by altering the AR scene.

Example 27 includes the non-transitory computer readable medium of any one of examples 20-26, wherein the instructions, in response to the user input to move the AR object to an area corresponding to a real world object associated with the first zone, further cause the one or more machines to render an interaction effect between the AR object and the real world object based on the first set of rules.

Example 28 includes the non-transitory computer readable medium of example 27, wherein the instructions further cause the one or more machines to prevent the AR object from moving into the area corresponding to the real world object.

Example 29 includes the non-transitory computer readable medium of any one of examples 20-28, wherein the instructions, in response to the user input to move the AR object to an area corresponding to a real world object associated with the second zone, further cause the one or more machines to track a user-intended position of the AR object in the area corresponding to the real world object, and remove a rendering of the AR object while the user-intended position overlaps the area corresponding to the real world object.

Example 30 includes the non-transitory computer readable medium of any one of examples 20-29, wherein the second set of rules constrain an appearance of movement of the AR object in the second zone to remain within boundaries of a 3D virtual space.

Example 31 includes the non-transitory computer readable medium of example 30, wherein the instructions, in response to the user input to move the AR object to a virtual position beyond the boundaries of the 3D virtual space, further cause the one or more machines to automatically generate the appearance of movement of the AR object in the depth direction along a boundary of the 3D virtual space.

Example 32 includes the non-transitory computer readable medium of any one of examples 20-31, wherein the first zone and the second zone correspond to a common surface in the real world environment.

Example 33 includes the non-transitory computer readable medium of any one of examples 20-32, wherein the first zone is adjacent the second zone with a boundary therebetween.

Example 34 includes the non-transitory computer readable medium of example 33, wherein the first zone corresponds to a first wall and the second zone corresponds to a second wall, the boundary corresponding to a corner where the first and second walls meet.

Example 35 includes the non-transitory computer readable medium of example 33, wherein the first zone corresponds to a wall and the second zone corresponds to a window in the wall, the boundary corresponding to a perimeter of the window.

Example 36 includes a method comprising rendering, by executing an instruction with at least one processor, an AR object to appear in a first zone of a real world environment, in response to user input moving, by executing an instruction with the at least one processor, the rendering of the AR object relative to the real world environment based upon a first set of rules, and rendering, by executing an instruction with the at least one processor, the AR object in a second zone of the real world environment, movement of the AR object in the second zone based on a second set of rules different than the first set of rules.

Example 37 includes the method of example 36, wherein the first set of rules is to constrain an appearance of movement of the AR object in the first zone to translation within a surface associated with the first zone, the second set of rules to enable the appearance of movement of the AR object in a depth direction extending perpendicular to a surface associated with the second zone.

Example 38 includes the method of example 37, wherein, in response to the user input to move the AR object beyond a boundary of the first zone rendering the AR object in the second zone at a point of transition corresponding to a location of the AR object rendered in the first zone, and removing the rendering of the AR object in the first zone, the boundary dividing the first zone from the second zone.

Example 39 includes the method of example 38, further including delaying the removal of the rendering of the AR object in the first zone for a period of time after the rendering of the AR object in the second zone.

Example 40 includes the method of any one of examples 37-39, further including generating the appearance of movement of the AR object in the first zone by maintaining the AR object at a consistent size as the AR object moves.

Example 41 includes the method of any one of examples 37-40, further including generating the appearance of movement of the AR object in the depth direction in the second zone by altering a size of the AR object as the AR object moves.

Example 42 includes the method of any one of examples 37-41, further including rendering an AR scene in the second zone, and generating the appearance of movement of the AR object in the depth direction by altering the AR scene.

Example 43 includes the method of any one of examples 37-42, further including, in response to the user input to move the AR object to an area corresponding to a real world object associated with the first zone, rendering an interaction effect between the AR object and the real world object based on the first set of rules.

Example 44 includes the method of example 43, further including preventing the AR object from moving into the area corresponding to the real world object.

Example 45 includes the method of any one of examples 37-44, further including, in response to the user input to move the AR object to an area corresponding to a real world object associated with the second zone tracking a user-intended position of the AR object in the area corresponding to the real world object, and removing a rendering of the AR object while the user-intended position overlaps the area corresponding to the real world object.

Example 46 includes the method of any one of examples 37-45, wherein the second set of rules constrain an appearance of movement of the AR object in the second zone to remain within boundaries of a 3D virtual space.

Example 47 includes the method of example 46, further including, in response to the user input to move the AR object to a virtual position beyond the boundaries of the 3D virtual space, automatically generating the appearance of movement of the AR object in the depth direction along a boundary of the 3D virtual space.

Example 48 includes the method of any one of examples 36-47, wherein the first zone and the second zone correspond to a common surface in the real world environment.

Example 49 includes the method of any one of examples 36-48, wherein the first zone is adjacent the second zone with a boundary therebetween.

Example 50 includes the method of example 49, wherein the first zone corresponds to a first wall and the second zone corresponds to a second wall, the boundary corresponding to a corner where the first and second walls meet.

Example 51 includes the method of example 49, wherein the first zone corresponds to a wall and the second zone corresponds to a window in the wall, the boundary corresponding to a perimeter of the window.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   at least one memory;
   instructions; and
   at least one processor to execute the instructions to:
   determine, based on a first user input, a first intended movement of an augmented reality (AR) object projected onto a first surface in a real world environment;

cause, based on the first intended movement, the AR object to be rendered to appear to move along the first surface at a fixed depth defined by the first surface;
determine, based on a second user input, a second intended movement of the AR object projected onto a second surface in the real world environment; and
cause, based on the second intended movement, the AR object to be rendered to appear to move with variable depth within a 3D virtual space, the 3D virtual space defined by the second surface and a virtual rear boundary, the virtual rear boundary to virtually extend behind the second surface from a perspective of a user.

2. The apparatus of claim 1, wherein at least a portion of the virtual rear boundary is to extend in a direction that is non-parallel and non-perpendicular to the second surface.

3. The apparatus of claim 1, wherein the virtual rear boundary is to virtually extend a first extent behind a first location on the second surface in a depth direction normal to the second surface, and the virtual rear boundary is to virtually extend a second extent behind a second location on the second surface in the depth direction, the first extent different than the second extent.

4. The apparatus of claim 1, wherein the first surface is delimited by a first border, the second surface is delimited by a second border, and the first border is adjacent the second border, the at least one processor to, in response to a third user input controlling movement of the AR object from the first surface to the second surface across the first and second borders:
cause the AR object to be rendered to appear, at a first point in time, on both (1) the first surface at a first point of transition adjacent the first border and (2) the second surface at a second point of transition adjacent the second border; and
stop the AR object from being rendered to appear on the first surface at a second point in time after the first point in time.

5. The apparatus of claim 1, wherein the at least one processor is to cause the AR object to be rendered to appear to move along the first surface at the fixed depth by maintaining the AR object at a consistent size relative to the first surface as the AR object appears to move.

6. The apparatus of claim 1, wherein the at least one processor is to cause the AR object to be rendered to appear to move with variable depth within the 3D virtual space by altering a size of the AR object relative to the second surface as the AR object appears to move.

7. The apparatus of claim 1, wherein the at least one processor is to:
determine the first intended movement is to control movement of the AR object to an area of the first surface corresponding to a real world object in front of the first surface; and
cause the AR object to be rendered to appear to interact with the real world object.

8. The apparatus of claim 1, wherein the at least one processor is to:
determine the second intended movement is to control movement of the AR object to a user-intended position within the 3D virtual space behind a real world object in front of the second surface; and
cause at least a portion of the AR object to not be rendered to make the AR object appear to move behind the real world object.

9. The apparatus of claim 1, wherein the at least one processor is to cause a projector to project the AR object onto at least one of the first surface or the second surface, the first and second surfaces being external to and distinct from the apparatus such that light from the projector passes through free space in the real world environment.

10. An apparatus comprising:
means for analyzing user inputs to:
determine, based on a first user input, a first intended movement of an augmented reality (AR) object projected onto a first surface in a real world environment; and
determine, based on a second user input, a second intended movement of the AR object projected onto a second surface in the real world environment; and
means for generating AR content to:
render, based on the first intended movement, the AR object to appear to move along the first surface at a fixed depth defined by the first surface; and
render, based on the second intended movement, the AR object to appear to move with variable depth within a 3D virtual space, the 3D virtual space defined by the second surface and a virtual rear boundary, the virtual rear boundary to virtually extend behind the second surface from a perspective of a user.

11. The apparatus of claim 10, wherein the first surface is delimited by a first border, the second surface is delimited by a second border, and the first border is adjacent the second border, the generating means to, in response to a third user input controlling movement of the AR object from the first surface to the second surface across the first and second borders:
render the AR object to appear, at a first point in time, on both (1) the first surface at a first point of transition adjacent the first border and (2) the second surface at a second point of transition adjacent the second border; and
stop rendering the AR object to appear on the first surface at a second point in time after the first point in time.

12. The apparatus of claim 10, wherein the generating means is to render the AR object to appear to move along the first surface at the fixed depth by maintaining the AR object at a consistent size relative to the first surface as the AR object appears to move.

13. The apparatus of claim 10, wherein the generating means is to render the AR object to appear to move with variable depth within the 3D virtual space by altering a size of the AR object relative to the second surface as the AR object appears to move.

14. The apparatus of claim 10, wherein the analyzing means is to determine the first intended movement is to control movement of the AR object to an area of the first surface corresponding to a real world object in front of the first surface, and the generating means is to render the AR object to appear to interact with the real world object.

15. The apparatus of claim 10, wherein the analyzing means is to determine the second intended movement is to control movement of the AR object to a user-intended position within the 3D virtual space behind a real world object in front of the second surface, and the generating means is to cause at least a portion of the AR object to not be rendered to make the AR object appear to move behind the real world object.

16. The apparatus of claim 10, wherein at least a portion of the virtual rear boundary is to virtually extend in a direction that is non-parallel and non-perpendicular to the second surface.

17. The apparatus of claim 10, wherein the virtual rear boundary is to extend a first extent behind a first location on the second surface in a depth direction normal to the second surface, and the virtual rear boundary is to extend a second extent behind a second location on the second surface in the depth direction, the first extent different than the second extent.

18. A non-transitory computer readable medium comprising instructions that, when executed, cause one or more machines to at least:
   determine whether a user input is to move an augmented reality (AR) object projected onto a first surface in a real world environment or is to move the AR object projected onto a second surface in the real world environment;
   cause the AR object to appear to move along the first surface at a fixed depth defined by the first surface when the user input is to move the AR object projected on the first surface; and
   cause the AR object to appear to move with variable depth within a 3D virtual space when the user input is to move the AR object projected onto the second surface, the 3D virtual space defined by the second surface and a virtual rear boundary, the virtual rear boundary to virtually extend behind the second surface from a perspective of a user.

19. The non-transitory computer readable medium of claim 18, wherein the first surface is delimited by a first border, the second surface is delimited by a second border, and the first border is adjacent the second border, the instructions to cause the one or more machines to, in response to a third user input controlling movement of the AR object from the first surface to the second surface across the first and second borders:
   cause the AR object to appear, at a first point in time, on both (1) the first surface at a first point of transition adjacent the first border and (2) the second surface at a second point of transition adjacent the second border; and
   cause the AR object to stop appearing on the first surface at a second point in time after the first point in time.

20. The non-transitory computer readable medium of claim 18, wherein the instructions are to cause the one or more machines to cause the AR object to appear to move along the first surface at the fixed depth by maintaining the AR object at a consistent size relative to the first surface as the AR object appears to move.

21. The non-transitory computer readable medium of claim 18, wherein the instructions are to cause the one or more machines to cause the AR object to appear to move with variable depth within the 3D virtual space by altering a size of the AR object relative to the second surface as the AR object appears to move.

22. The non-transitory computer readable medium of claim 18, wherein the instructions are to cause the one or more machines to:
   determine the first intended movement is to control movement of the AR object to an area of the first surface corresponding to a real world object in front of the first surface; and
   cause the AR object to appear to interact with the real world object.

23. The non-transitory computer readable medium of claim 18, wherein the instructions are to cause the one or more machines to:
   determine the second intended movement is to control movement of the AR object to a user-intended position within the 3D virtual space behind a real world object in front of the second surface; and
   cause the AR object to appear to move behind the real world object by causing at least a portion of the AR object to not appear.

24. The non-transitory computer readable medium of claim 18, wherein the instructions cause the one or more machines to define at least a portion of the virtual rear boundary to virtually extend in a direction that is non-parallel and non-perpendicular to the second surface.

25. The non-transitory computer readable medium of claim 18, wherein the instructions cause the one or more machines to define the virtual rear boundary to virtually extend a first extent behind a first location on the second surface in a depth direction normal to the second surface, and to define the virtual rear boundary to virtually extend a second extent behind a second location on the second surface in the depth direction, the first extent different than the second extent.

26. An apparatus comprising:
   a user input analyzer to determine whether a user input is to move an augmented reality (AR) object projected onto a first surface in a real world environment or is to move the AR object projected onto a second surface in the real world environment; and
   an AR content generator to:
      cause the AR object to appear to move along the first surface at a fixed depth defined by the first surface when the user input is to move the AR object projected on the first surface; and
      cause the AR object to appear to move with variable depth within a 3D virtual space when the user input is to move the AR object projected onto the second surface, the 3D virtual space defined by the second surface and a virtual rear boundary, the virtual rear boundary to virtually extend behind the second surface from a perspective of a user.

27. The apparatus of claim 26, wherein the first surface is delimited by a first border, the second surface is delimited by a second border, and the first border is adjacent the second border, the AR content generator to, in response to a third user input controlling movement of the AR object from the first surface to the second surface across the first and second borders:
   cause the AR object to appear, at a first point in time, on both (1) the first surface at a first point of transition adjacent the first border and (2) the second surface at a second point of transition adjacent the second border; and
   remove the AR object from the first surface at a second point in time after the first point in time.

28. The apparatus of claim 26, wherein the AR content generator is to cause the AR object to appear to move along the first surface at the fixed depth by maintaining the AR object at a consistent size relative to the first surface as the AR object appears to move.

29. The apparatus of claim 26, wherein the AR content generator is to cause the AR object to appear to move with variable depth within the 3D virtual space by altering a size of the AR object relative to the second surface as the AR object appears to move.

30. The apparatus of claim 26, wherein at least a portion of the virtual rear boundary is to extend in a direction that is non-parallel and non-perpendicular to the second surface.

31. The apparatus of claim 26, wherein the virtual rear boundary is to virtually extend a first extent behind a first location on the second surface in a depth direction normal to the second surface, and the virtual rear boundary is to virtually extend a second extent behind a second location on the second surface in the depth direction, the first extent different than the second extent.

* * * * *